(12) United States Patent
Himuro

(10) Patent No.: US 6,892,775 B1
(45) Date of Patent: May 17, 2005

(54) PNEUMATIC RADIAL TIRE FOR ALL-SEASON PASSENGER CAR

(75) Inventor: Yasuo Himuro, Tachikawa (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 08/997,368

(22) Filed: Dec. 23, 1997

(30) Foreign Application Priority Data

Feb. 21, 1997 (JP) .............................................. 9-038137

(51) Int. Cl.⁷ ........................ B60C 11/12; B60C 103/04
(52) U.S. Cl. .............................. 152/209.2; 152/209.15; 152/209.18; 152/209.28; 152/DIG. 3
(58) Field of Search ........................ 152/209.2, 209.15, 152/209.18, 209.28, DIG. 3, 209 R, 209 D

(56) References Cited

U.S. PATENT DOCUMENTS

| | | | | |
|---|---|---|---|---|
| 5,234,042 A | * | 8/1993 | Kuhr et al. | ............. 152/209 R |
| 5,423,364 A | * | 6/1995 | Himuro | ................... 152/209 R |
| 5,609,699 A | * | 3/1997 | Himuro | ................... 152/209 R |
| 5,837,074 A | * | 11/1998 | Uemura | |

FOREIGN PATENT DOCUMENTS

| | | | | |
|---|---|---|---|---|
| EP | 627332 | * | 12/1994 | ............. 152/209 R |
| EP | 688685 | * | 12/1995 | ............. 152/209 R |
| EP | 705718 | * | 4/1996 | ............. 152/209 R |
| JP | 5-319025 | * | 12/1993 | ............. 152/209 D |
| JP | 6-40215 | * | 2/1994 | ............. 152/209 D |

* cited by examiner

*Primary Examiner*—Steven D. Maki
(74) *Attorney, Agent, or Firm*—Sughrue Mion, PLLC

(57) ABSTRACT

A pneumatic radial tire for all-season passenger car comprises a tread with a tread block pattern defined by plural slant grooves and at least one circumferential center groove and consisting of a central zone having a width corresponding to 30–60% of a tread width and a pair of side zones located on both sides of the central zone, wherein the slant grooves comprise steeply slant grooves and gently slant grooves each having a given shape, and the number of the gently slant grooves is made two times or more than the number of the steeply slant grooves, and the block is provided with at least one sipe, and each of the blocks defined by the circumferential center groove and the steeply slant grooves is chamfered from a tapered top end over a given range toward a longitudinal direction of the block.

9 Claims, 3 Drawing Sheets

PNEUMATIC RADIAL TIRE FOR ALL-SEASON PASSENGER CAR

BACKGROUND OF THE INVENTION

1. Field of the Invention

This invention relates to a pneumatic tire and more particularly to a pneumatic radial tire for all-season passenger car use.

2. Description of Related Art

As shown in FIG. 3, the conventionally typical pneumatic radial tire for all-season passenger car use had a tread pattern in which many blocks were formed at given intervals in an axial direction and in a circumferential direction of the tire by a plurality of circumferential grooves straightforward extending in the circumferential direction and a plurality of slant grooves each extending at an inclination angle of about 45° with respect to the circumferential direction.

In this type of the pneumatic radial tire for all-season passenger car use, it is required to have various performances such as drainage property in the while running on a wet road surface, steering stability while running on a dry road surface, snow performances in the running on snow, e.g. braking performance, traction performance, straight running performance, cornering performance and the like, resistance to uneven wear and so on.

Recently, it is demanded to develop pneumatic radial tires for all-season passenger car developing an excellent drainage property in the running on wet road surface without substantially sacrificing the steering stability while running on a dry road surface, the snow performances and the resistance to uneven wear.

SUMMARY OF THE INVENTION

It is, therefore, an object of the invention to provide a pneumatic radial tire for all-season passenger car use having an excellent drainage property while running on wet road surfaces without degrading various performances of the conventional pneumatic radial tire for all-season passenger car use, particularly the steering stability while running on a dry road surface, the snow performances and the resistance to uneven wear.

According to the invention, there is the provision of in a pneumatic radial tire for all-season passenger car use comprising a tread with a tread pattern defined by dividing the tread into many blocks through a plurality of slant grooves arranged at given intervals in a circumferential direction of the tire and at least one circumferential center groove extending in the circumferential direction of the tire at a center of the pattern, and consisting of a central zone having a width corresponding to 30–60% of a tread width and a pair of side zones located on both sides of the central zone (1) the slant grooves comprise steeply slant grooves extending at a relatively small inclination angle with respect to the circumferential direction and gently slant grooves extending at a relatively large inclination angle with respect to the circumferential direction;

(2) the steeply slant groove are opened to the circumferential center groove in the central zone of the tread, while the gently slant groove are opened to a tread end in each of both side zones of the tread;

(3) the number of the gently slant grooves is made two times or more than the number of the steeply slant grooves so that an interval between the gently slant grooves in the circumferential direction is made ½ or less than an interval between the steeply slant grooves in the circumferential direction;

(4) each of the blocks is provided with at least one sipe; and (5) each of the blocks defined by the circumferential center groove and the steeply slant grooves is chamfered from a tapered top end over a range of 10–30 mm in a longitudinal direction of the block so as to gradually shallow a depth of a surface of the block from the tapered top end in the longitudinal direction.

In preferable embodiments of the invention, the steeply slant groove extends at an inclination angle of 10°–50° with respect to the circumferential direction. The gently slant groove extends at an inclination angle of 60°–90° with respect to the circumferential direction. The chamfered surface of the block is a curved surface having a radius of curvature of 10–100 mm. The steeply slant groove communicates with the gently slant groove.

In other preferable embodiments of the invention, a circumferential side groove extending in the circumferential direction of the tire is arranged in a position separated inward from the tread end at about ¼ of the tread width in an axial direction of the tire, and the gently slant groove is opened to the circumferential side groove.

In other preferable embodiments of the invention, the extending direction of the side formed in the block differs between the central zone and the side zone of the tread, and the sipe formed in the blocks at both side zones of the tread extends in parallel to or substantially in parallel to the gently slant groove to be opened to the circumferential side groove. The sipe formed in the block at the central zone of the tread is opened to the steeply slant groove at a cross angle of not less than 45°.

BRIEF DESCRIPTION OF THE DRAWINGS

The invention will be described with reference to the accompanying drawings, wherein.

DESCRIPTION OF PREFERRED EMBODIMENTS

Figure 1:
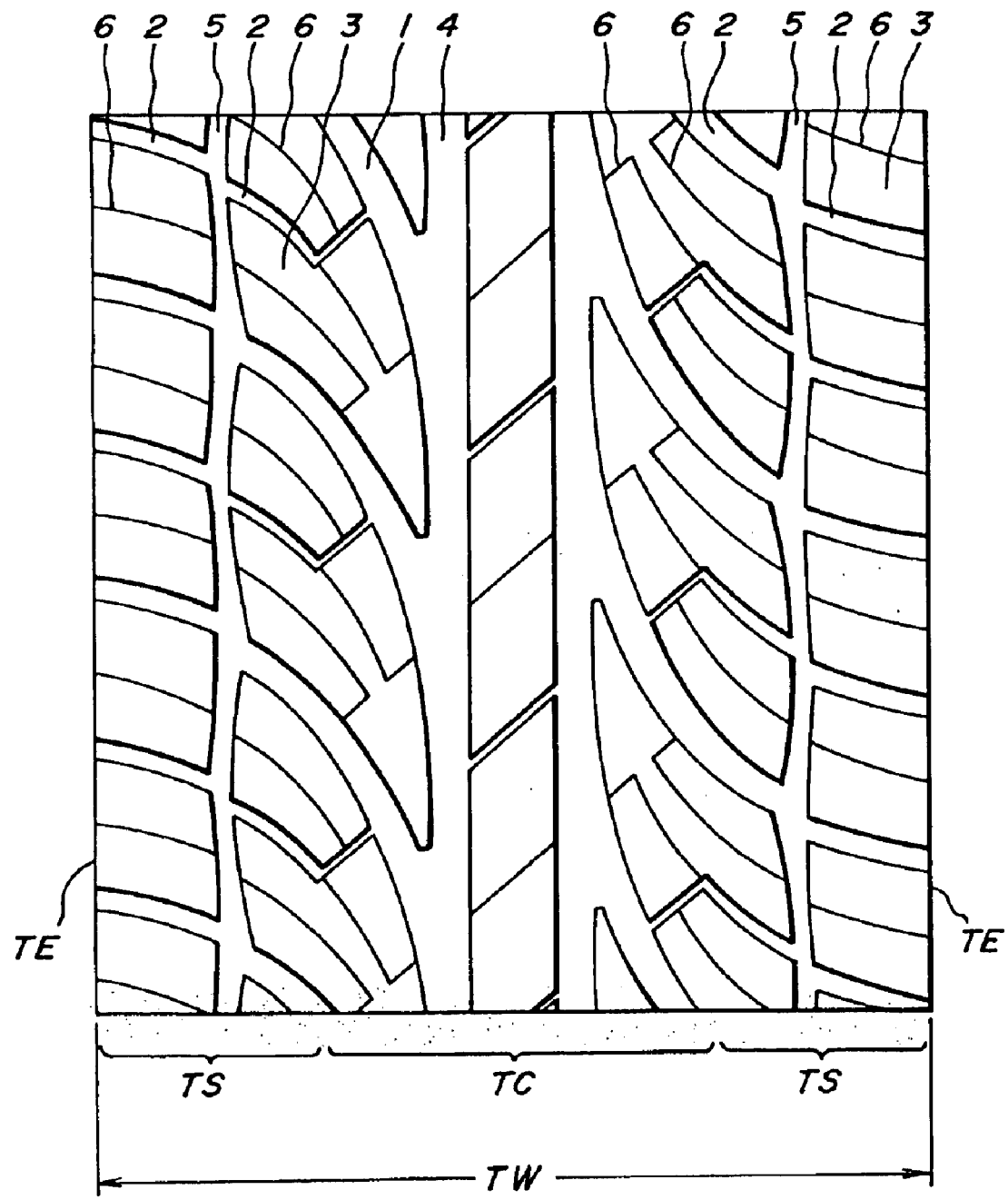
FIG. 1 is a partly enlarged plan view of a first embodiment of the tread pattern in the pneumatic radial tire according to the invention.

In the pneumatic radial tire according to the invention having the above structure, at least one circumferential center groove extending in the circumferential direction of the tire is particularly arranged in the center of the pattern. The steeply slant groove arranged in the central zone of the tread and opening to the circumferential center groove communicates with the gently slant groove arranged in each side zone of the tread and opening to the tread end, so that the draining action is smoothly carried out from the pattern center toward the tread end. Hence there is obtained a pneumatic radial tire having an excellent drainage property in the running on wet road surface. However, a tapered top end portion is formed in each of the blocks defined by the circumferential center groove and the steeply slant grooves, so that there may be caused a tendency of extremely degrading the steering stability in the running on dry road surface and the resistance to uneven wear due to the lacking of block rigidity.

Furthermore, each of the blocks defined by the circumferential center groove and the steeply slant grooves is chamfered from the tapered top end over a range of 10–30 mm toward the longitudinal direction of the block so as to gradually shallow the depth of the block surface from the tapered top end toward the longitudinal direction as mentioned above. Consequently, the branching of water flow is smoothly carried out to control or prevent the occurrence of air bubbles due to turbulence and to improve the drainage property of the tire. In this case, the block rigidity is ensured, so that there is not caused the extreme degradation of the steering stability in the running on dry road surface and the resistance to uneven wear. Preferably, the chamfered surface of the block is a curved surface having a radius of curvature of 10–100 mm, so that the resistance of water can efficiently be decreased and also crushing can be suppressed to obtain a high ground contact pressure and hence ensure the steering stability.

Additionally, the number of the gently slant grooves is made two or more times the number of the steeply slant grooves so that an interval between the gently slant grooves in the circumferential direction is made ½ or less than an interval between the steeply slant grooves in the circumferential direction as mentioned above. As a result the interval between the gently slant grooves in the circumferential direction is relatively large in the central zone of the tread including the steeply slant grooves and hence block rigidity is ensured. The interval between the gently slant grooves in the circumferential direction is relatively small in each of both side zones of the tread including the gently slant grooves and hence the drainage property while running on a wet road surface, pitch variation effect for controlling the pattern noise and the resistance to uneven wear (heel and toe wear) are improved.

Moreover, at least one sipe is formed in each of the blocks, so that the snow performances as an all-season tire and the gripping performances while running on wet road surface are ensured. When the extending direction of the side formed in the block differs between the central zone and the side zone of the tread, the directionality of block rigidity in the tread pattern can be denied to suppress the occurrence of bad steering control and uneven wear (diagonal wear). Moreover, the sipe formed in the block at the central zone of the tread is opened to the steeply slant groove at a cross angle of not less than 45°, so that the resistance to uneven wear is improved.

The following examples are given in illustration of the invention and are not intended as limitations thereof.

In FIG. 1 is shown a tread pattern of the pneumatic radial tire according to the invention having a tire size of 205/60R15 and a tread width TW of 160 mm as Example 1.

As shown in FIG. 1, the tread of this tire comprises a central zone TC having a width corresponding to 45% of the tread width TW and a pair of side zones TS located on both sides of the central zone TC. The tire has a tread pattern defined by dividing the tread into many blocks 3 through a plurality of slant grooves 1, 2 arranged at given intervals in a circumferential direction of the tire and two circumferential center grooves 4 extending in the circumferential direction of the tire at a center portion of the pattern.

The slant grooves 1, 2 comprise steeply slant grooves 1 extending at a relatively small inclination angle of 20°–40° with respect to the circumferential direction and gently slant grooves 2 extending at a relatively large inclination angle of 70°–80° with respect to the circumferential direction. The steeply slant grooves 1 are arranged in the central zone TC of the tread and are opened to the circumferential center groove 4, while the gently slant grooves 2 are arranged in each of the side zones TS in the tread and are opened to an end TE of the tread.

The gently slant grooves 2 are arranged in a number larger by two times than that of the steeply slant grooves 1 in such a manner that the interval between the gently slant grooves 2 in the circumferential direction is ½ of the interval between the steeply slant grooves in the circumferential direction. Further, the steeply slant groove 1 communicates with the gently slant groove 2. In this case, since the number of the gently slant grooves 2 is larger by two times than the number of the steeply slant grooves 1, all of the steeply slant grooves 1 are communicated with only half of the total gently slant grooves 2.

A circumferential side groove 5 extending in the circumferential direction is arranged in a position separated inward from the tread end TE by about ¼ of the tread width TW in an axial direction of the tire. The gently slant groove 2 opens to the circumferential side groove 5.

At least one sipe 6 is formed in each of the blocks 3, in which the extending direction of the sipe 6 in the block 3 is upward and to the right in the central zone TC of the tread and upward to the left in both side zones TS of the tread as shown in FIG. 1. Further, the sipe 6 formed in the block 3 at each of the side zones TS extends in parallel to or substantially in parallel to the gently slant groove 2 and opens to the circumferential side groove 5, while the sipe 6 formed in the block 3 at the central zone TC is opened to the steeply slant groove 1 at a cross angle of not less than 45°.

Each of the blocks 3 defined by the circumferential center grooves 4 and the steeply slant grooves 1 is chamfered from the tapered top end over 25 mm in the longitudinal direction of the block so as to gradually shallow the depth of the block surface from the tapered top end in the longitudinal direction as mentioned above, and the chamfered surface of the block is a curved surface having a radius of curvature of about 30 mm. As shown in FIG. 1, the sipes 6 are arranged and configured so as to divide the block 3 into first, second and third tread elements, wherein the first tread element is generally arrow-shaped with a head portion comprising the chamfered top end and a rear portion separating the second and third tread elements.

Figure 2:
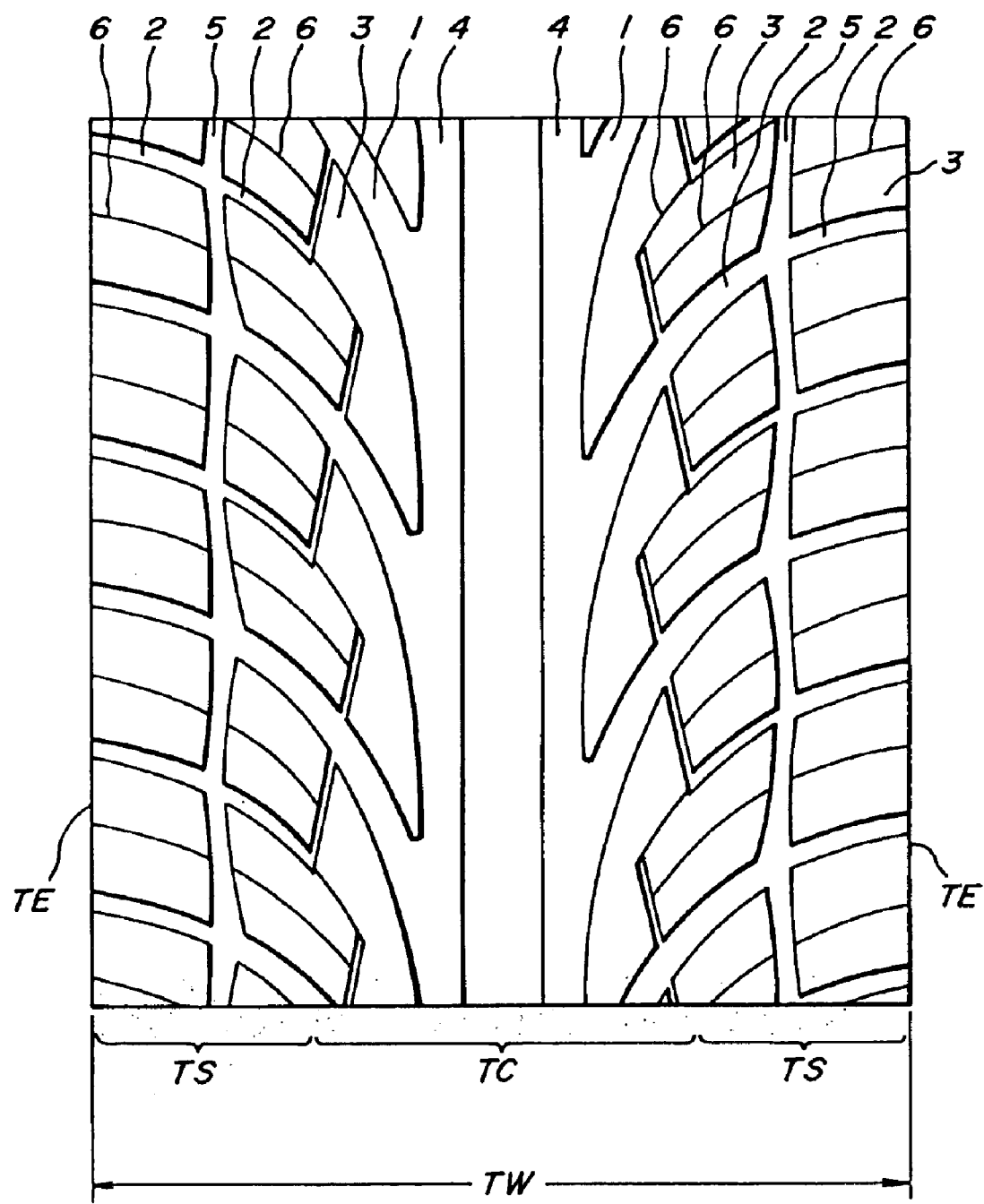
FIG. 2 is a partly enlarged plan view of a second embodiment of the tread pattern in the pneumatic radial tire according to the invention.

In FIG. 2 is shown a tread pattern of the pneumatic radial tire according to the invention having a tire size of 205/60R15 and a tread width TW of 160 mm as Example 2.

As shown in FIG. 2, the tread of this tire comprises a central zone TC having a width corresponding to 45% of the tread width Tw and a pair of side zones TS located on both sides of the central zone TC and has a tread pattern defined by dividing the tread into many blocks 3 through a plurality of slant grooves 1, 2 arranged at given intervals in a circumferential direction of the tire and two circumferential center grooves 4 extending in the circumferential direction of the tire at a center portion of the pattern.

The slant grooves 1, 2 comprise steeply slant grooves 1 extending at a relatively small inclination angle of 20°–40° with respect to the circumferential direction and gently slant grooves 2 extending at a relatively large inclination angle of 70°–80° with respect to the circumferential direction. The steeply slant grooves 1 are arranged in the central zone TC of the tread and open to the circumferential center groove 4, while the gently slant grooves 2 are arranged in each of the side zones TS in the tread and open to an end TE of the tread.

The gently slant grooves 2 are arranged in a number larger by two times than that of the steeply slant grooves 1 in such a manner that the interval between the gently slant grooves 2 in the cirfcumferential direction is ½ of the interval between the steeply slant grooves in the circumferential direction. Further, the steeply slant groove 1 communicates with the gently slant groove 2. In this case, since the number of the gently slant grooves 2 is larger by two times than the number of the steeply slant grooves 1, all of the steeply slant grooves 1 communicates with only half of the total gently slant grooves 2.

A circumferential side groove 5 extending in the circumferential direction is arranged in a position separated inward from the tread end TE by about ¼ of the tread width TW in an axial direction of the tire. The gently slant groove 2 is opened to the circumferential side groove 5.

At least one sipe 6 is formed in each of the blocks 3, in which the sipe 6 is arranged in only the block 3 located in both side zones TS and is not arranged in the block 3 located in the central zone TC as shown in FIG. 2. Each of the blocks 3 defined by the circumferential center groove 4 and the steeply slant grooves 1 is chamfered from the tapered top end over 25 mm toward the longitudinal direction of the block 80 as to gradually shallow the depth of the block surface from the tapered top end toward the longitudinal direction as mentioned above, and the chamfered surface of the block is a curved surface having a radius of curvature of about 30 mm.

Figure 3:
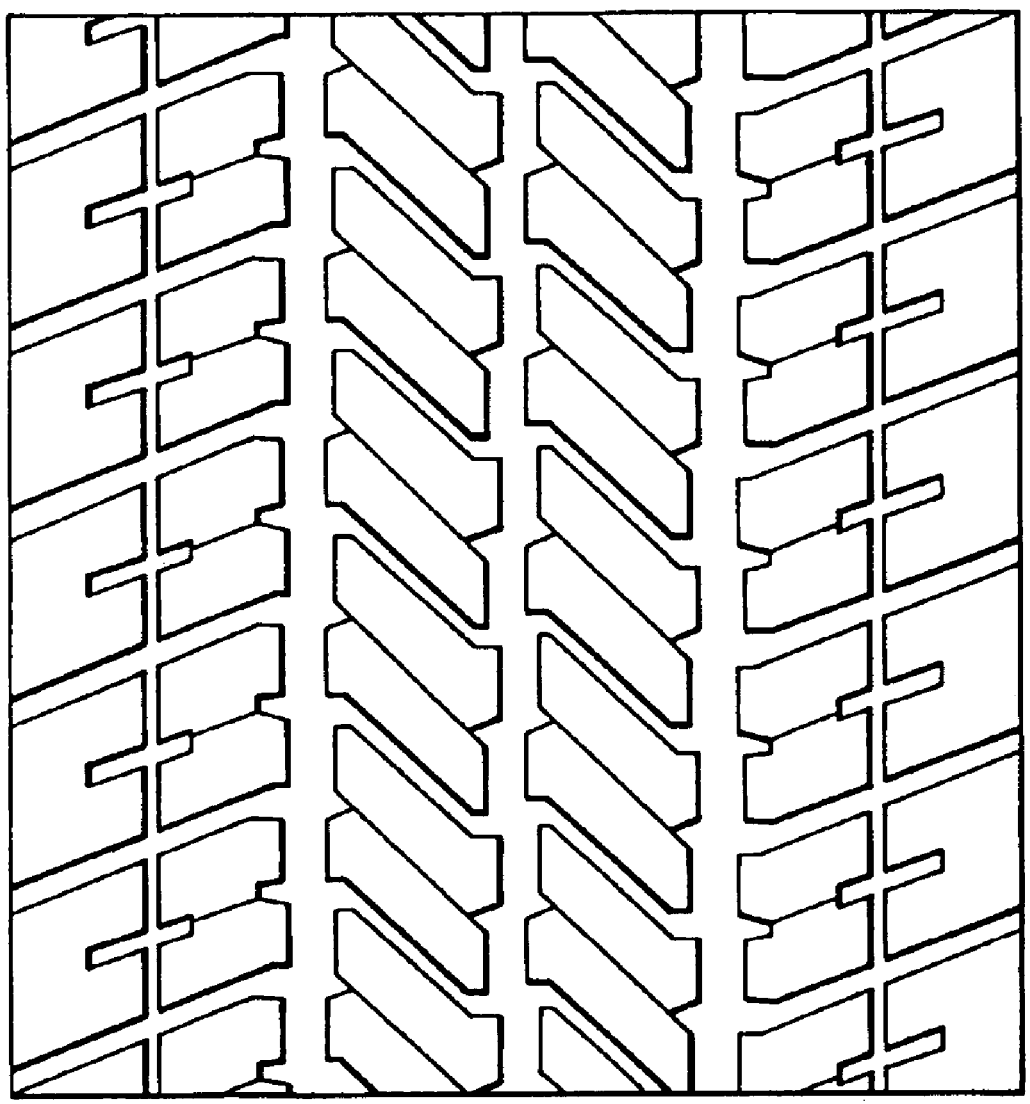
FIG. 3 is a partly enlarged plan view of a tread pattern in the conventional pneumatic radial tire.

FIG. 3 illustrates a tread pattern of a pneumatic radial tire as a conventional example.

The tread of such a conventional tire has a tread pattern defined by dividing the tread into many blocks through five circumferential grooves extending straightforward in the circumferential direction and a plurality of slant grooves extending at an inclination angle of about 45° with respect to the circumferential direction.

A test for evaluating the drainage property in the running on wet road surface, the steering stability on dry road surface, the snow performances and the resistance to uneven wear was carried out with respect to the tires of Examples 1 and 2 and a conventional example.

The drainage property in the running on a wet road surface is evaluated by driver's feeling on a hydroplaning limit speed when the tire is run on a wet road surface having a water depth of 5 mm, and the steering stability on dry road surface is evaluated by driver's feeling when the tire is run on a circuit course at various sport running modes, and the snow performances are total feeling evaluation of braking performance, traction performance, straight running performance and cornering performance on a pressed snow road surface of a test course, and the resistance to uneven wear is totally evaluated by visual evaluation of worn shape when the tire is run on roads including an expressway, a mountain slope and streets over a distance of 10,000 km and measurement of step difference between adjoining blocks.

The test results are shown in Table 1, in which each of the properties is represented by an index on the basis that the conventional tire is 100. The larger the index value, the better the property.

TABLE 1

| Tire | Example 1 | Example 2 | Conventional Example |
|---|---|---|---|
| Drainage property | 120 | 140 | 100 |
| Steering stability | 100 | 105 | 100 |
| Snow performances | 105 | 90 | 100 |
| Resistance to uneven wear | 100 | 100 | 100 |

As mentioned above, according to the invention, there are provided pneumatic radial tires developing an excellent drainage property in the running on wet road surface without degrading the steering stability in the running on dry road surface, the snow performances and the resistance to uneven wear.

What is claimed is:

1. In a pneumatic radial tire for all-season passenger car comprising:
   a tread with a tread pattern defined by dividing the tread into many blocks through a plurality of slant grooves arranged at given intervals in a circumferential direction of the tire and at least one circumferential center groove extending in the circumferential direction of the tire at a center portion of the pattern, and consisting of a central zone having a width corresponding to 30–60% of a tread width and a pair of side zones located on both sides of the central zone; wherein
   (1) the slant grooves comprise steeply slant grooves extending at a relatively small inclination angle with respect to the circumferential direction and gently slant grooves extending at a relatively large inclination angle with respect to the circumferential direction;
   (2) the steeply slant grooves are opened to the circumferential center groove in the central zone of the tread, while the gently slant grooves are opened to a tread end in each of said side zones of the tread to form blocks in said side zones;
   (3) the number of the gently slant grooves is made two or more times than the number of the steeply slant grooves so that an interval between the gently slant grooves in the circumferential direction is made ½ or less than an interval between the steeply slant grooves in the circumferential direction;
   (4) each of the blocks is provided with at least one sipe; and
   (5) blocks formed in the central zone are defined by the circumferential center groove and the steeply slant grooves and are chamfered from a tapered top end over a range of 10–30 mm in a longitudinal direction of the block so as to gradually shallow a depth of a surface of the block from the tapered top end toward an opposite end of the block; and
   wherein the block formed in the central zone of the tread has at least two sipes, each opening to a steeply slant groove at a cross angle of not less than 45°, and said at least two sipes are arranged and configured so as to divide the block into first, second and third tread elements, wherein the first tread element is generally arrow-shaped with a head portion comprising the chamfered tapered top end and a rear portion separating the second and third tread elements.

2. A pneumatic radial tire according to claim 1, wherein each steeply slant groove extends at an inclination angle of 10°–50° with respect to the circumferential direction.

3. A pneumatic radial tire according to claim 1, wherein each gently slant groove extends at an inclination angle of 60°–90° with respect to the circumferential direction.

4. A pneumatic radial tire according to claim 1, wherein the chamfered surface of each block is a curved surface having a radius of curvature of 10–100 mm.

5. A pneumatic radial tire according to claim 1, wherein the steeply slant groove communicates with a gently slant groove that opens to a tread end.

6. A pneumatic radial tire according to claim 1, wherein a circumferential side groove extending in the circumferential direction of the tire is arranged in a position separated inward from a tread end at about ¼ of the tread width in an axial direction of the tire.

7. A pneumatic radial tire according to claim 6, wherein each gently slant groove is opened to the circumferential side groove.

8. A pneumatic radial tire according to claim 1, wherein an inclination direction of a side of a block formed in the central zone is different than an inclination direction of a side of a block formed in the side zone of the tread.

9. A pneumatic radial tire according to claim 1, wherein the sipe formed in the blocks at said side zones of the tread extends parallel to or substantially parallel to the gently slant groove.

* * * * *